US008522304B2

(12) United States Patent
Molen et al.

(10) Patent No.: US 8,522,304 B2
(45) Date of Patent: Aug. 27, 2013

(54) MONITORING AND REPORTING POLICY COMPLIANCE OF HOME NETWORKS

(75) Inventors: Brett Thomas Molen, West Jordan, UT (US); George B. Norr, Midvale, UT (US); John Thomas Welch, Orem, UT (US); Richard L. Ehlers, Park City, UT (US); Wael R. Midani, West Valley, UT (US)

(73) Assignee: Ibahn General Holdings Corporation, South Jordan, UT (US)

( * ) Notice: Subject to any disclaimer, the term of this patent is extended or adjusted under 35 U.S.C. 154(b) by 1697 days.

(21) Appl. No.: 11/530,403

(22) Filed: Sep. 8, 2006

(65) Prior Publication Data

US 2008/0066145 A1  Mar. 13, 2008

(51) Int. Cl.
*H04L 29/06* (2006.01)
*G06F 11/30* (2006.01)
*G06F 15/16* (2006.01)

(52) U.S. Cl.
USPC ....... 726/1; 726/3; 726/22; 709/220; 709/223

(58) Field of Classification Search
None
See application file for complete search history.

(56) References Cited

U.S. PATENT DOCUMENTS

| 6,079,020 | A * | 6/2000 | Liu ................................. 726/15 |
| 6,697,962 | B1 | 2/2004 | McCrory et al. |
| 6,708,187 | B1 * | 3/2004 | Shanumgam et al. ................ 1/1 |
| 6,941,465 | B1 * | 9/2005 | Palekar et al. ..................... 726/1 |
| 6,986,160 | B1 * | 1/2006 | LeGrow ............................ 726/1 |
| 6,987,847 | B1 | 1/2006 | Murphy et al. |
| 7,039,430 | B2 | 5/2006 | Kang et al. |
| 7,050,555 | B2 | 5/2006 | Zargham et al. |
| 7,231,668 | B2 * | 6/2007 | Jacobson ........................ 726/26 |
| 7,246,156 | B2 | 7/2007 | Ginter |
| 7,324,804 | B2 | 1/2008 | Hrastar et al. |
| 7,353,533 | B2 | 4/2008 | Wright et al. |
| 7,546,629 | B2 * | 6/2009 | Albert et al. ....................... 726/1 |
| 7,975,286 | B1 * | 7/2011 | Fickey et al. ..................... 726/1 |
| 8,245,280 | B2 * | 8/2012 | Song et al. ........................ 726/3 |
| 2002/0032770 | A1 | 3/2002 | Fertell et al. |
| 2002/0069369 | A1 | 6/2002 | Tremain |
| 2002/0072358 | A1 | 6/2002 | Schneider et al. |
| 2002/0177448 | A1 | 11/2002 | Moran et al. |
| 2003/0014644 | A1 * | 1/2003 | Burns et al. ................... 713/182 |
| 2003/0045286 | A1 | 3/2003 | Taylor |
| 2003/0171111 | A1 | 9/2003 | Clark |
| 2003/0191911 | A1 * | 10/2003 | Kleinschnitz et al. ........ 711/154 |
| 2003/0229808 | A1 | 12/2003 | Heintz |
| 2004/0064351 | A1 | 4/2004 | Mikurak |

(Continued)

FOREIGN PATENT DOCUMENTS

WO   WO 2008/030732 A2 *   3/2008

OTHER PUBLICATIONS

Final Office Action dated Jan. 23, 2009 from U.S. Appl. No. 11/078,908.

(Continued)

*Primary Examiner* — Christopher Revak
(74) *Attorney, Agent, or Firm* — Marsh Fischmann & Breyfogle LLP; Daniel J. Sherwinter (57) ABSTRACT

Methods and apparatus are described for monitoring and configuring home networks for a variety of purposes such as, for example, facilitating secure communications between the home network and a remote network, and facilitating provision of a service by a service provider such as, for example, a cellular carrier.

24 Claims, 7 Drawing Sheets

(56) References Cited

U.S. PATENT DOCUMENTS

| | | | |
|---|---|---|---|
| 2004/0111643 A1* | 6/2004 | Farmer | 713/201 |
| 2004/0181690 A1* | 9/2004 | Rothermel et al. | 713/201 |
| 2004/0185777 A1 | 9/2004 | Bryson | |
| 2004/0198389 A1 | 10/2004 | Alcock et al. | |
| 2004/0210912 A1 | 10/2004 | Jeronimo | |
| 2004/0261116 A1 | 12/2004 | Mckeown et al. | |
| 2004/0266533 A1 | 12/2004 | Gentles et al. | |
| 2005/0114474 A1* | 5/2005 | Anderson et al. | 709/220 |
| 2005/0129001 A1 | 6/2005 | Backman et al. | |
| 2005/0193103 A1* | 9/2005 | Drabik | 709/221 |
| 2005/0198532 A1 | 9/2005 | Comlekoglu et al. | |
| 2005/0209876 A1* | 9/2005 | Kennis et al. | 705/1 |
| 2005/0273851 A1* | 12/2005 | Raju Datla et al. | 726/14 |
| 2006/0010492 A9 | 1/2006 | Heintz et al. | |
| 2006/0025985 A1* | 2/2006 | Vinberg et al. | 703/22 |
| 2006/0136986 A1* | 6/2006 | Doolittle | 726/1 |
| 2006/0190985 A1* | 8/2006 | Vasishth et al. | 726/1 |
| 2006/0203736 A1 | 9/2006 | Molen et al. | |
| 2007/0261121 A1* | 11/2007 | Jacobson | 726/26 |
| 2007/0266422 A1* | 11/2007 | Germano et al. | 726/1 |
| 2008/0195579 A1* | 8/2008 | Kennis et al. | 707/3 |
| 2008/0235771 A1* | 9/2008 | Corley et al. | 726/4 |
| 2008/0244741 A1* | 10/2008 | Gustafson et al. | 726/23 |
| 2008/0263185 A1* | 10/2008 | Anderson et al. | 709/220 |

OTHER PUBLICATIONS

Office Action dated Apr. 27, 2009 from U.S. Appl. No. 11/078,908.
Office Action dated Nov. 17, 2009 from U.S. Appl. No. 11/078,908.
International Preliminary Report on Patentability dated Sep. 20, 2007, PCT Application No. PCT/US2006/008596.
International Preliminary Report on Patentability dated Mar. 19, 2009, PCT Application No. PCT/US07/76993.
International Search Report and Written Opinion of the International Searching Authority dated Apr. 18, 2008 for International Application No. PCT/US07/76993.
Office Action dated Jun. 23, 2008 for U.S. Appl. No. 11/078,908.
International Search Report dated Aug. 15, 2007, recieved in related PCT Application No. PCT/US06/08596.
Written Opinion dated Aug. 15, 2007, recieved in related PCT Application No. PCT Application No. PCT/US06/08596.

\* cited by examiner

MONITORING AND REPORTING POLICY COMPLIANCE OF HOME NETWORKS

RELATED APPLICATION DATA

The present application contains subject matter which is related to the subject matter described in U.S. patent application Ser. No. 11/078,908 filed on Mar. 10, 2005, the entire disclosure of which is incorporated herein by reference for all purposes.

BACKGROUND OF THE INVENTION

The present invention relates to techniques for monitoring the state of home networks including items such as security and Quality of Service (QoS) and, more specifically, to enabling configuration of such networks in accordance with one or more policies.

Corporate IT managers spend tremendous amounts of time, money, and resources creating reliable and secure network environments for their users. A vast array of sophisticated tools enable IT personnel to monitor and control the behavior of users, the configuration of machines, and the enforcement of corporate IT policies on their corporate intranets. Tools such as Hewlett Packard's OpenView Management Software provide corporate NOCs with near real-time data on network usage. However, the business necessity of providing support for users working from home often defeats many of the safeguards IT personnel so painstakingly put in place.

Depending on the definition of "telecommuter," estimates range from 6.9 to 67 million Americans working from home, many of whom connect with the office network. While working at home, telecommuters often connect to their office networks via home networks which are not typically configured with robust security. That is, home networks are generally configured for ease of use rather than security. Internet service providers want to minimize support calls so they try to make things as generic as possible. In addition, with adoption of WiFi, home networks have become increasingly vulnerable to unauthorized users from outside the home. People with malicious intent are able drive around neighborhoods looking for wireless access points (APs) with which to connect to gain access to the home network and, through them, to corporate networks. In addition, neighbors may gain access to the home network without leaving their homes. Consumer APs do not typically come with any security enabled by default, and the most widely supported encryption algorithms (WEP, WPA personal) have been cracked.

Wireless networks in the home are also becoming increasingly attractive to cellular phone carriers as a solution to providing better coverage inside homes. That is, providing cellular coverage in homes is a challenge for carriers. If a home has a stucco exterior, this typically includes a wire mesh which is problematic for the transmission of cellular signals. Taking advantage of the relatively better coverage of a wireless home network within such a structure may get around this issue. However, carriers have a culture of control in all aspects of the communication and security of their networks. Offloading data to the home network means giving up control in that they are no longer the providers of the network into the home.

It is therefore desirable to provide tools and techniques by which corporate IT policies may be reliably enforced on the home networks of telecommuters. It is also desirable to provide tools and techniques by which carriers may extend monitoring, quality of service compliance, and security into the homes of their users.

SUMMARY OF THE INVENTION

According to specific embodiments of the present invention, methods and apparatus are provided for monitoring and configuring a home network to facilitate secure communications between the home network and a remote network. At least one security parameter associated with the home network is monitored. It is determined whether the at least one security parameter conforms to a policy associated with the remote network. Where the at least one security parameter does not conform to the policy, automatic configuration of at least one device on the home network is enabled to facilitate compliance with the policy.

According to other specific embodiments of the invention, methods and apparatus are provided to facilitate provision of a service by a service provider. A state associated with the home network is monitored. It is determined whether the state of the home network conforms to a policy associated with the service provider. Where the state of the home network does not conform to the policy, automatic configuring of at least one device on the home network is enabled to facilitate compliance with the policy.

A further understanding of the nature and advantages of the present invention may be realized by reference to the remaining portions of the specification and the drawings.

DETAILED DESCRIPTION OF SPECIFIC EMBODIMENTS

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

According to specific embodiments of the present invention, techniques are provided by which a home network may be monitored and configured in accordance with one or more policies. A service, an application, or set of services, applications, and associated modules deployed on a telecommuter's home network gather data regarding the state of the home network. These data are then used to modify or configure one or more of the devices on the home network to conform to the policies. According to specific embodiments, the present invention comprises a managed service that automatically interrogates and secures the home network, thereby only allowing authorized access to remote networks, e.g., a telecommuter's corporate network.

It should be noted that the services, application, and modules which enable various aspects of specific embodiments of the invention will be referred to herein in the singular, i.e., as "the background application." However, it should be understood that this is merely for the sake of simplicity and should not be used to limit the scope of the invention.

According to some embodiments, the background application is a software or firmware solution that can be installed on the home computer, a home networking device, or a combination of such devices on the home network. Such home networking devices could include, for example, cable or DSL modems, wired or wireless routers, home gateways, wireless access points, Ethernet and optical networking devices, video encoding devices, media servers, VoIP devices, and the like. The background application could also be implemented in a separate, stand-alone hardware device deployed on the home network.

Regardless of how it is deployed, the background application provides a view into the current status of the home network. It is operable to determine the devices attached to the home network and the topology of the home network. It is operable to detect and correct security vulnerabilities in the home network. With the knowledge of the devices attached to the network (whether programmatically or through a software interface), the background application can automatically check device configuration and change the configuration if not set for the proper security.

In addition to security and according to some embodiments, the background application may be operable to do the same for configuring Quality of Service (QoS) as defined by a service provider, e.g., a cellular carrier or a Voice over IP (VoIP) service provider referred to herein in the singular as a "carrier." For example, in embodiments where the client device on the home network is a cellular phone, the cellular carrier will want to ensure that voice traffic on the home network has sufficient priority to meet a QoS level to which the carrier is committed. A VoIP service provider will want similar visibility and control in the case of a VoIP device in a home which connects to the Internet via the home network.

The background application of the present invention enables the customization of policies and enforces them on the home network. These policies may be defined by the corporation or the carrier and automatically updated to all the homes on a regular basis. In addition to these capabilities, the background application provides corporations and carriers greater visibility into the status of the home network.

According to some embodiments, the background application on the home network is also operable to provide corporate IT or carrier personnel with a wide variety of data (e.g., status, location, performance, security, and other data) for each of their users and their home networks in near real-time. This may be accomplished using, for example, a hosted platform in which access to the data is provided via a web interface. Alternatively, these data may be transmitted directly to the corporation or carrier. In any case, whatever mechanism is employed to provide access to these data, the telecommuting NOC made possible by the present invention enables these personnel to monitor and/or support their users in new and powerful ways.

Figure 1:
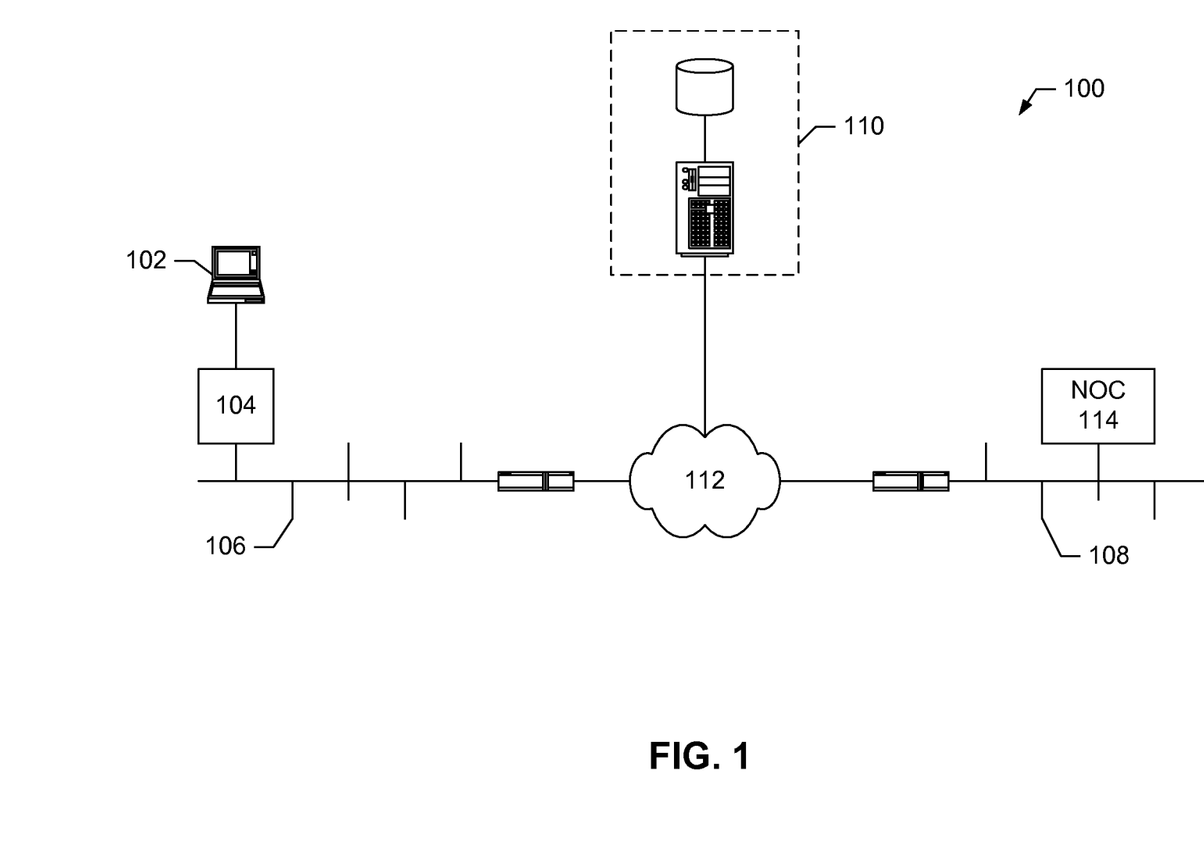
FIG. 1 is a diagram of an exemplary network environment in which embodiments of the invention may be implemented.
Figure 2:
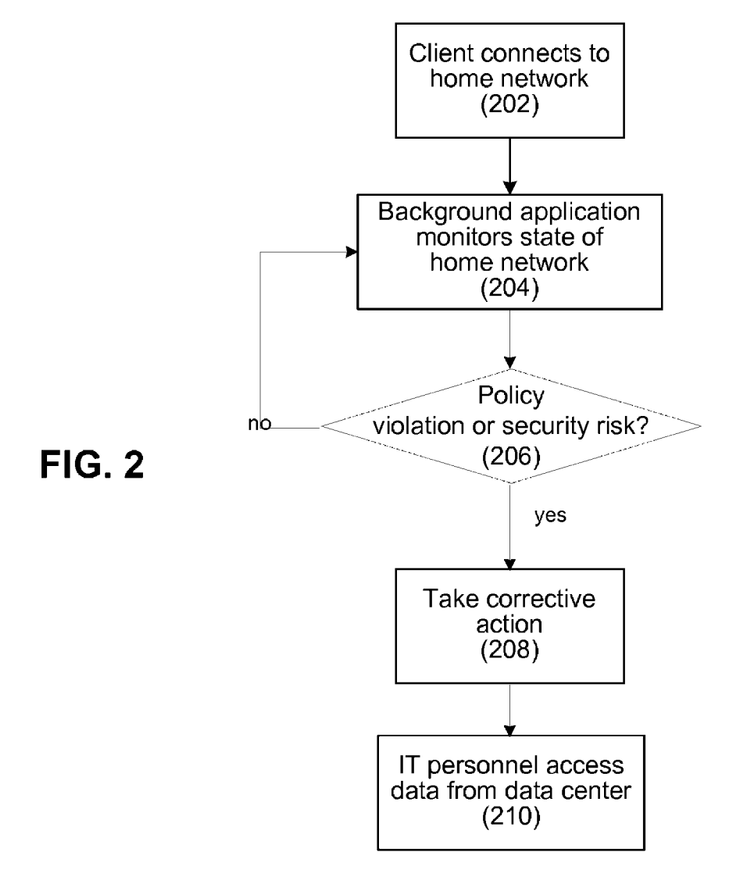
FIG. 2 is a flowchart illustrating a specific embodiment of the invention.

FIG. 1 shows an exemplary network environment 100 for the purpose of illustrating specific embodiments of the invention. FIG. 2 is a flowchart illustrating one such embodiment. A client machine (e.g., a desktop or laptop computer) 102 connects to an access node 104 (e.g., a wireless router or cable modem) on a home network 106 which is remote and distinct from a corporate network 108 (202). One or more applications running in the background on either or both of client 102 and access node 104 (or any other device on the home network), i.e., the background application, accumulate data relating to the state of home network 106 (204). These data may include the configuration and operational characteristics of any of the various devices connecting to home network 106 as well as a wide variety of operational and security parameters associated with the network as a whole.

Where the state of home network 106 deviates from corporate IT or carrier policy or is characterized by some other security threat (206), the background application takes appropriate ameliorative action (208). Such action may be to automatically reconfigure any of the devices on home network 106 and/or to transmit an alert to a remote data center 110 via Internet 112. For example, the background application could enable encryption on a wireless access point on the home network, or configure the access point to prohibit port-to-port communication by untrusted devices. Further examples of the types of network and device parameters which may be monitored and the corresponding corrective actions are provided below.

According to some implementations, the background application is operable to communicate with the corporate or carrier NOC in a secure manner. This may be achieved, for example, using an encrypted tunnel (e.g., IPsec tunnel) between the home network and the NOC for all communications. It will be understood that a wide variety of other techniques for conducting communication between the home network and the NOC may be employed.

Corporate IT or carrier personnel (represented by NOC 114 on network 108) access the accumulated data from data center 110 via Internet 112 (210) using, for example, a secure web interface which allows these personnel to monitor each of their remote users. Alternatively, the accumulated data may be transmitted directly to NOC 114. It should be understood that the remote user and home network data may be accessed at locations remote from network 108, e.g., by personnel who are using mobile devices or who are themselves connecting from home.

It should be understood that the devices and network of FIG. 1 are merely exemplary and that many alternatives of each may be employed to implement various embodiments of the invention. For example, client machine 102 may be any of a wide variety of computing devices including, for example, a desktop computer, a laptop computer, a handheld device, a PDA, a cellular phone, an email client, etc. Similarly, access node 104 may be any of a wide variety of home network devices including, for example, wired and wireless routers, home network gateways, various types of modems, etc. In addition, any of a variety of conventional and proprietary architectures and devices may be employed for networks 106 and 108, data center 110, and NOC 114 to implement the various functionalities described with reference to those elements of FIG. 1.

More generally, although embodiments of the present invention described herein refer to home networks and telecommuters or cellular users, it should be understood that these embodiments are merely exemplary and that the fundamental aspects of the present invention are much more widely applicable. For example, the functionalities described herein may be implemented in a wide variety of networks such as, for example, wireless hotspots, conference and convention facilities, hospitality industry facilities, remote offices, etc.

According to various embodiments of the invention, a wide range of data relating to various aspects of remote device and network operation may be accumulated for a wide range of purposes. For example, detailed information relating to the nature of the network to which the user's device is connecting may be generated. For example, the background application (and/or any associated modules) could determine whether the IP addresses associated with the network are public or private, with private being preferred from a security standpoint. In addition, the background application could cause probes to be transmitted on the network to determine whether any other devices on the network may be detected. If any such devices successfully respond to such probes, this could indicate an unacceptable security risk. Further probes of responding devices could be effected to determine the nature or magnitude of the risk. In any case, it will be understood that a wide variety of information relating to security could be determined regarding the nature of the network.

As mentioned above, when the state of the home network does not conform to one or more policies, e.g., policies set by corporate IT or carrier personnel, or an unacceptable risk is identified, e.g., an unauthorized device attempting access to the home network, a notification or alert may be transmitted to the NOC on the managed service provider, corporate, or carrier network. In addition or alternatively, and according to specific embodiments of the invention, the background application is operable to automatically configure one or more devices on the home network to establish compliance with policy.

According to various embodiments of the invention, the background application may be operable to secure all data communication between the home network and a corporate network by, for example, enforcing a specific type of encryption, or configuring home network devices to only allow transmissions to the corporate network from authorized devices. This may be further facilitated by the ability to identify the actual user requesting access to the corporate network. This may be accomplished, for example, using any of a wide variety of authentication techniques including relatively simple approaches such as requiring usernames and passwords, as well as more complex techniques such as public/private key encryption and digital certificates. Several examples follow.

The background application may further facilitate secure communications by detecting suspicious connections to the home network. Such connections could be identified, for example, by the detection of unknown MAC addresses. In addition, the background application could obtain specific device information by probing devices connected or attempting to connect to the network, or by performing deep packet inspection analysis. Traffic from too many IP addresses may also be used as an indicator of unauthorized or suspicious activity on the home network.

The background application could determine whether there are any rogue devices trying to access data on home network devices through packet inspection of the network traffic. The corrective measure could be to configure a home network device, e.g., a router, to drop packets from the rogue device.

Whether encryption is enabled on a wireless access point may be detected by either looking at the configuration of the access point (using protocols like SNMP or Telnet), or wirelessly sniffing the information being sent out from the access point. The corrective action could be to allow automatic configuration of the access point.

Similarly, whether an access point is configured to allow device-to-device communication may be detected by looking at the configuration of the access point (again using protocols like SNMP or Telnet). The corrective action could be to allow automatic configuration of the access point.

Whether traffic destined for the remote network is encrypted may be detected by doing packet inspection on the traffic. The corrective action could be to configure a home network device, e.g., a router, to drop the unencrypted packets. Alternatively, the background application could automatically establish an encrypted tunnel to the remote network.

Whether any company sensitive files are being transmitted via the network may be detected using deep packet inspection on the network traffic. The corrective action could be to configure a home network device to drop the file The background application could determine whether a device on the home network trying to connect to the remote network is authorized to do so by, for example, analyzing identification mechanisms such as device specific certificates. The corrective action could be to configure a home network device to drop the packets if access is not authorized.

The background application could also determine whether the user of a device connecting or attempting to connect to the remote network is authorized by, for example, querying the access device for user identification including, for example, user certificates, biometric information, etc. The corrective action could be to configure a home network device to drop the packets if user identification is not confirmed.

Whether the home network is configured to prioritize network traffic based upon application may be detected by looking at the configuration of one or more network devices (using protocols like SNMP or Telnet). The corrective action could be to enable or allow automatic configuration of the network devices.

Information relating to the security of the user's device (i.e., client 102) itself may also be generated. For example, the background application may determine whether the device has a firewall installed, and whether the firewall is currently enabled. This could be accomplished, for example using tie ins with industry standard firewalls and their logs. Similarly, information relating to the virus defense of the device may be generated, e.g., is anti-virus software installed? Is it enabled? Has it been updated recently? Whether software is enabled could be determined, for example, by determining what processes are currently running (e.g., with reference to the current task list) on the device.

Software version information could be determined, for example, with reference to the signature file numbers associated with the particular anti-virus software. This information could be collected and stored at the NOC and then pushed out to the client device at the request of the background application. According to specific embodiments, where it is determined that the device does not have the most current version of the software being evaluated (whether anti-virus or some other software), the actual updates could either be pushed from or their installation facilitated by the NOC.

Information relating to the spyware status of the user's device may also be accumulated. For example, the background application may determine whether spyware detection software is installed, when the last scan for spyware occurred, and whether any commonly known infections were detected. Many of the techniques described above with reference to viruses may also be applicable in this context. For example, the NOC could integrate with large spyware detection providers to determine whether updates are necessary and to effect such updates. In addition, infections could be detected by looking at what processes are currently running or at firewall logs.

The background application could also determine and report on what ports are currently open. That is, because spyware and viruses often open up ports to transmit information, a report on the ports open may be used to determine whether a device has been infected.

The background application might also determine whether the user's device is running the virtual private network (VPN) dictated by its company's IT policies, i.e., whether the VPN is installed and/or being used. Again, by looking at what processes are currently running on the device, the background application should be able to determine whether the VPN is being used and, if not, generate an alert to the telecommuter, the NOC, or both.

Figure 3:
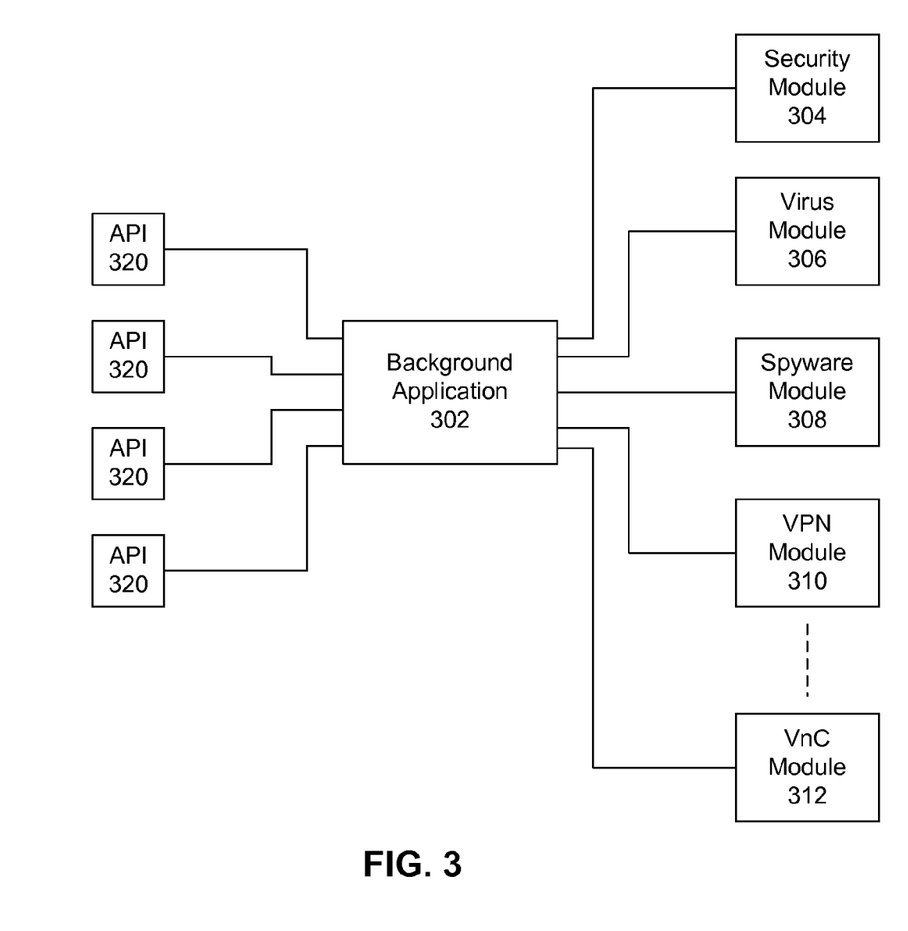
FIG. 3 is a simplified block diagram of an exemplary background application and associated modules for use with specific embodiments of the invention.

According to a specific embodiment illustrated in FIG. 3, the background application deployed on the home network comprises a base application 302 and any of a plurality of modules (e.g., security module 304, anti-virus module 306, spyware module 308, VPN module 310, etc.) depending upon the type of user data to be monitored and/or collected. The base application 302 may comprise, for example, a operating system service which runs in the background and looks for events which, when detected, will trigger operation of one or more of the associated modules which perform one or more tests and report back to base application 302. For example, when a telecommuting user connects to his home network, this event could be detected by base application 302 which would then trigger operation of security module 304 which might, for example, check the security of the network to which the user is connecting, determine whether the user's firewall is enabled, etc. The security module may be configured to automatically correct any security issues identified by configuring the appropriate devices on the home network in accordance with corporate IT policies.

Base application 302 may also be configured to generate alerts in response to the results of the operation of the various associated modules. That is, for example, in response to the security module 304 determining that home network is not secure or that policies are not being followed, base application 302 may generate an alert which is transmitted to the NOC for presentation to IT personnel via whatever NOC interface is employed. Similarly, if a virus or spyware infection is detected, or if the anti-virus or anti-spyware software has been disabled, base application 302 could generate alerts to the NOC. Alternatively, these alerts may be generated by the individual modules rather than the base application.

According to some embodiments, the base application 302 is extensible, including APIs 320 to which IT personnel can program and connect their own modules for any desired functionality. For example, the IT policies for a given enterprise might make it desirable to include a module for the remote users of that enterprise which monitors specific metrics of interest in response to any of the events that the base application is configured to detect.

As discussed above, one of the goals of specific embodiments of the invention is to enable IT personnel to provide remote support for their telecommuting users. A conventional mechanism for doing this is using a technique known as virtual network computing (VNC) which enables a user, e.g., desktop support personnel, on one device to take over control of a remote device, e.g., a laptop on the home network of a telecommuter. However, there are security issues relating to having a VNC connection open all the time. Therefore, according to a specific embodiment, a specific event detected by the base application 302, e.g., a request from a remote desktop support person, may trigger the establishment of a VNC connection by a VNC module 312. Enabling the base application on the client device to initiate the VNC connection can greatly simplify establishing the connection in that the device's security configuration may make it difficult for a remote user to initiate the connection. Similarly, when the communication between the remote device and the device on the home network is complete (e.g., as detected by the base application), termination of the VNC connection may be effected.

In situations where the event triggering the VNC connection is a request from a remote device (or in any situation in which two-way communication is established with the telecommuter's device), it is desirable to determine whether the requester is entitled to access the device. This may be accomplished, for example, through the use of tokens or digital certificates to authenticate communications between telecommuting users and the remote devices.

The accumulated information about telecommuting users and their home networks, e.g., conformance or non-conformance with IT policies, may be communicated to IT personnel in a number of ways. For example, if a wireless device connects to a home network without wireless encryption against his company's IT policies, in addition to automatic corrective action at the home network, an alert could be generated which results in an email being transmitted to IT personnel associated with NOC 114. Alternatively, the status of a graphical representation of the non-conforming user's machine or network in, for example, a web interface having representations of multiple users displayed, might change, e.g., from green to red. Then, by selecting the graphical representation, the IT personnel could be provided with more detailed information regarding the status of that machine or network.

Figure 4A:
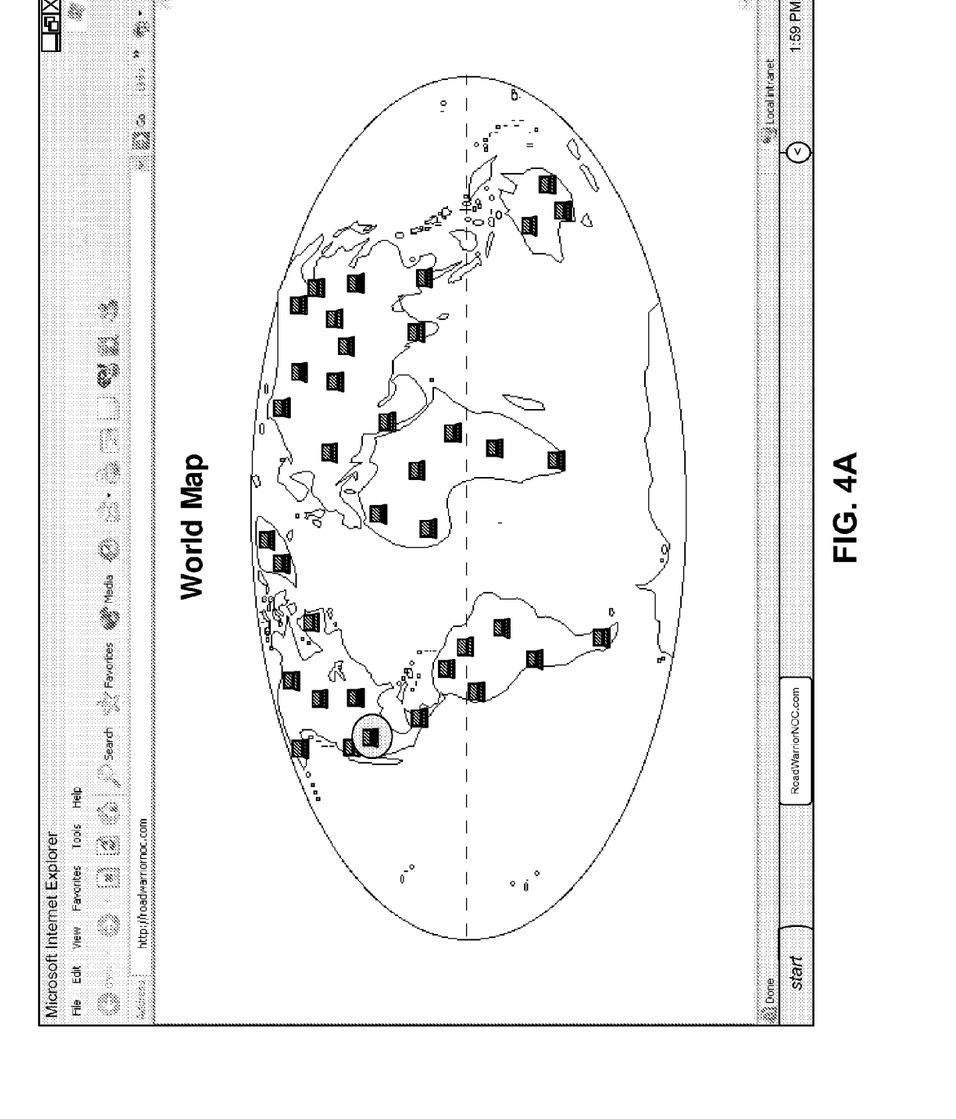
FIG. 4A-4D are exemplary screenshots illustrating interfaces for monitoring home networks according to a specific embodiment of the invention.
Figure 4B:
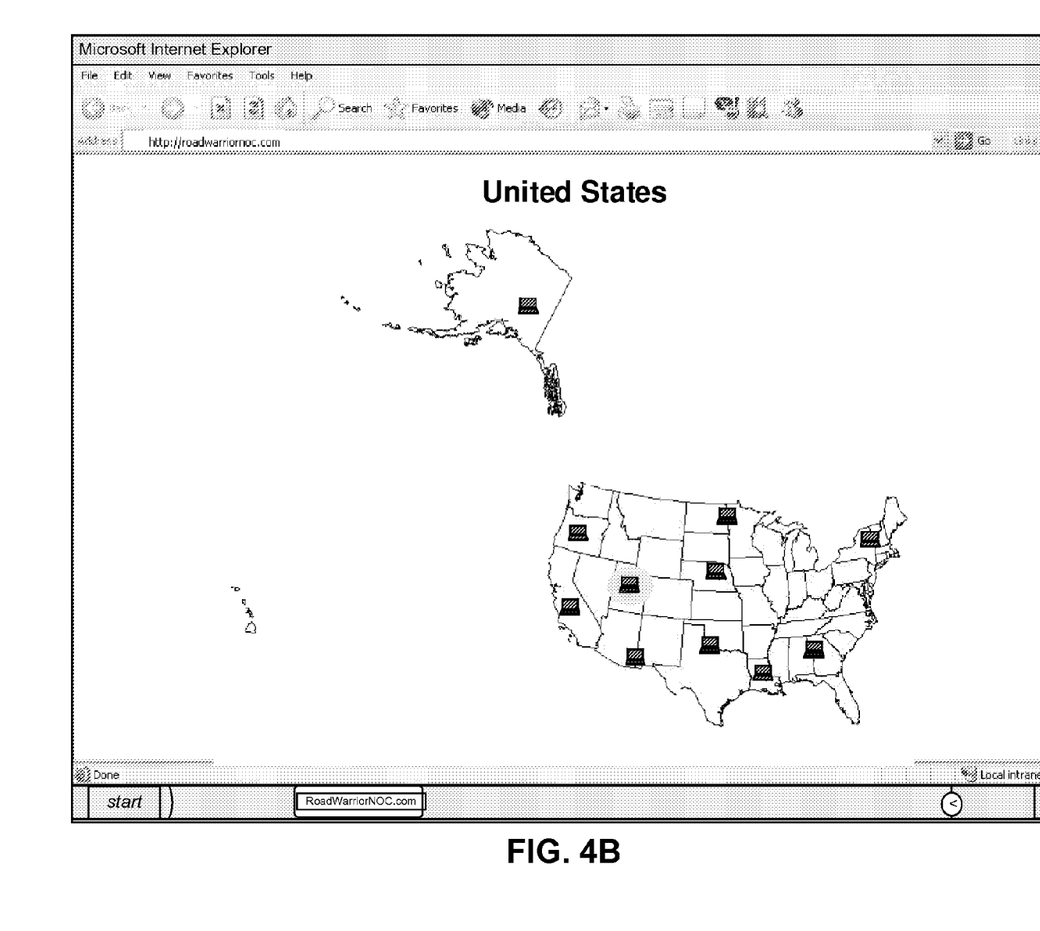
Figure 4C:
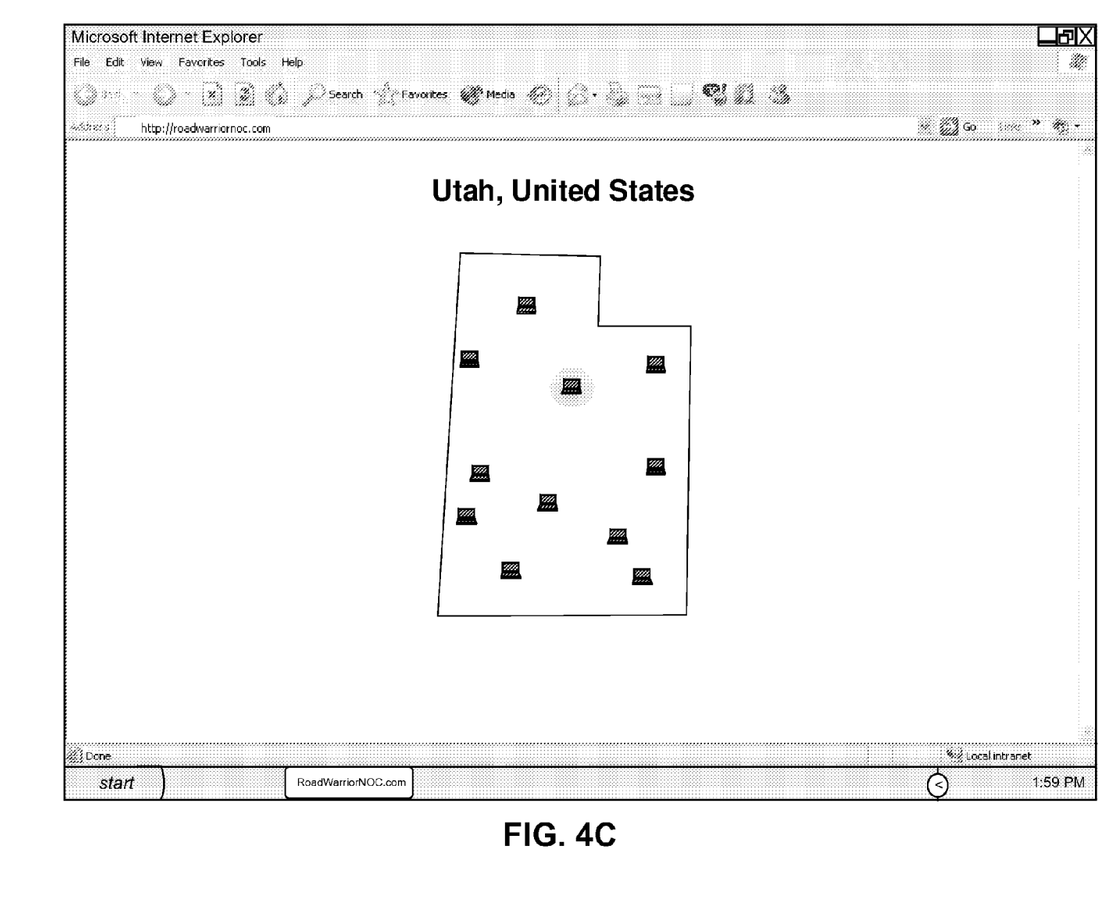
Figure 4D:
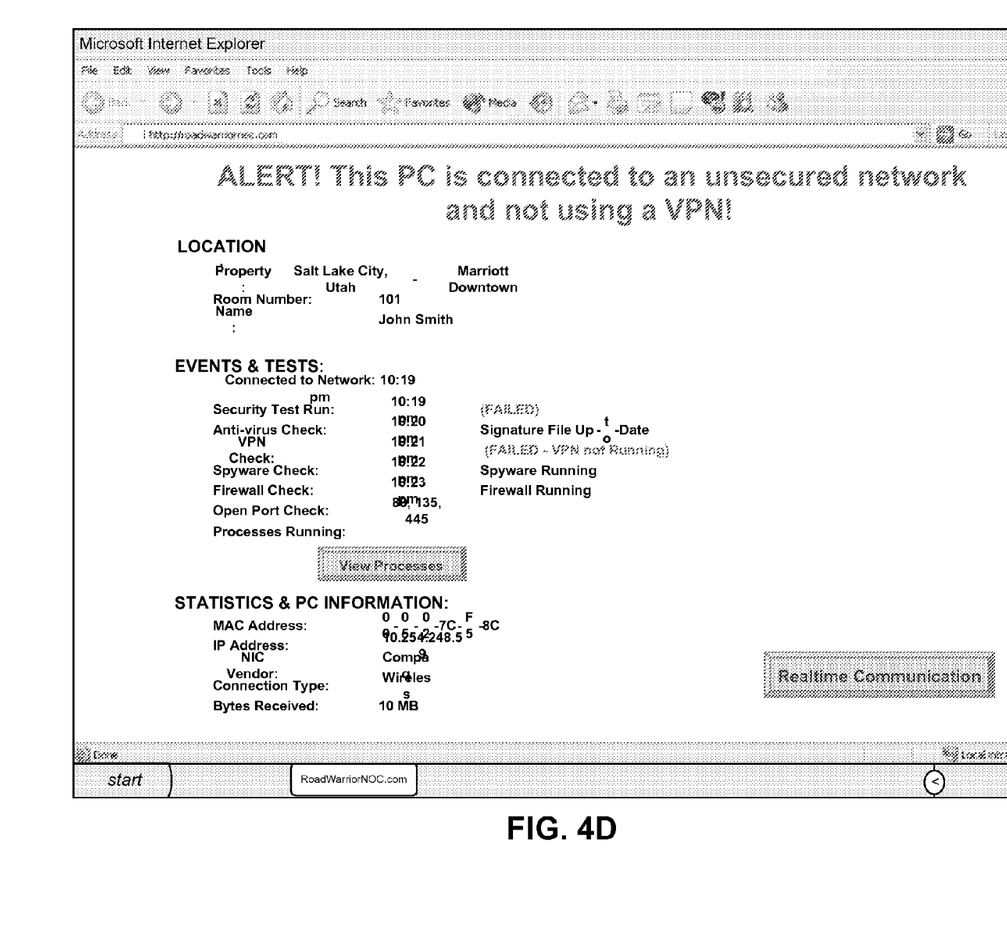

FIGS. 4A-4D are exemplary screenshots illustrating interfaces for monitoring telecommuting and/or mobile users according to a specific embodiment of the invention. The screenshot of FIG. 4A shows a global view that might be presented to the IT personnel of a global corporation having laptop icons for each country or region in which the enterprise currently has users. Alerts associated with a particular region or country could be indicated, for example, by coloring the corresponding laptop icon red. By selecting a red laptop icon (e.g., the circled icon in the southwest region of the U.S., IT personnel could drill down as shown in FIG. 4B and then again in FIG. 4C to get to a view in which the laptop icons correspond to individual devices or home networks. Selection of these icons would then result in presentation of an interface such as the one shown in FIG. 4D in which detailed information regarding the corresponding device or home network is provided.

Embodiments of the invention may provide a near real-time collaboration tool between telecommuting and mobile users and IT personnel at a company NOC. According to such embodiments, IT personnel are able to communicate with non-conforming users or with users experiencing difficulties to achieve compliance with IT policy or to provide other types of support. For example, when IT personnel are notified of an event such as, for example, one of their users accessing an unsecure network, an interface might be provided to the IT personnel in which they could generate a message to the user alerting the user and possibly providing information or documentation regarding how to correct the situation. Such messaging could be enabled in conjunction with the background application residing on the home network or a mobile device. Additionally, the messaging functionality in the background application may facilitate two-way communication, enabling remote users to request IT support. As discussed above, communications between IT personnel and users could be effected using authentication (e.g., tokens, certificates) and encryption (e.g., IPsec tunnels). And as discussed above, the background application may also be configured to facilitate opening of a VNC connection to enable corporate IT personnel to modify settings on the remote device VNC.

While the invention has been particularly shown and described with reference to specific embodiments thereof, it will be understood by those skilled in the art that changes in the form and details of the disclosed embodiments may be made without departing from the spirit or scope of the invention. In addition, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer program product comprising at least one non-transitory computer-readable medium having computer program instructions stored therein which are operable to cause at least one computing device to monitor and configure a home network to facilitate secure communications between the home network and a remote network, the computer program instructions comprising:
    first instructions for identifying a set of devices presently communicating on the home network and for monitoring at least one security parameter associated with the home network, the at least one security parameter defined according to a policy corresponding to an enterprise associated with the remote network;
    second instructions for locally detecting, by a background application running on one of the set of devices, that the at least one security parameter fails to conform to the policy, wherein the home network corresponds to a residence of a person employed by the enterprise, and wherein the home network has a corresponding network provider not affiliated with the enterprise; and
    third instructions for automatically configuring at least one of the devices to facilitate compliance with the policy in response to detecting that the at least one security parameter does not conform to the policy.

2. The computer program product of claim 1 wherein the at least one device comprises one or more of a desktop computer, a laptop computer, a handheld computing device, a cellular phone, an email client, a gateway, a wired router, a wireless router, a cable modem, a DSL modem, a wireless access point, an Ethernet networking device, an optical networking device, a video encoding device, a media server, or a VoIP device.

3. The computer program product of claim 1 wherein the first, second, and third instructions are deployed on the home network.

4. The computer program product of claim 3 wherein the first, second, and third instructions are embodied in any of software, firmware, or hardware.

5. The computer program product of claim 1 wherein first instructions are operable to determine whether a process specified by the policy is operating on the home network.

6. The computer program product of claim 5 wherein the specified process relates to one or more of encryption, authentication, firewall protection, virus protection, spyware protection, access point configuration, or data access.

7. The computer program product of claim 5 wherein the third instructions are operable to effect operation of the specified process on the home network.

8. The computer program product of claim 1 wherein the first instructions are operable to detect at least one configuration parameter or operational parameter of the at least one device.

9. The computer program product of claim 8 wherein the third instructions are operable to modify the at least one configuration parameter or operational parameter of the at least one device.

10. The computer program product of claim 1 wherein the first instructions are operable to detect access to the home network by an unauthorized device.

11. The computer program product of claim 10 wherein the third instructions are operable to configure the at least one device to inhibit transmission from the unauthorized device to the remote network or other devices on the home network.

12. The computer program product of claim 1 further comprising fourth instructions for generating a representation of the home network for presentation in a network operations center (NOC) interface associated with the remote network substantially in real time.

13. The computer program product of claim 1 wherein third instructions automatically configure the at least one of the devices to facilitate compliance with the policy using the background application.

14. A computer-implemented method for monitoring and configuring a home network to facilitate secure communications between the home network and a remote network, comprising:
    monitoring at least one security parameter associated with the home network including identifying devices presently communicating on the home network, the at least one security parameter defined according to a policy corresponding to an enterprise associated with the remote network;
    locally detecting, by a background application running on one of the set of devices, that the at least one security parameter fails to conform to the policy, wherein the home network corresponds to a residence of a person employed by the enterprise, and wherein the home network has a corresponding network provider not affiliated with the enterprise; and
    in response to detecting that the at least one security parameter does not conform to the policy, automatically configuring at least one of the devices to facilitate compliance with the policy.

15. The computer-implemented method of claim 14 wherein the at least one device comprises one or more of a desktop computer, a laptop computer, a handheld computing device, a cellular phone, an email client, a gateway, a wired router, a wireless router, a cable modem, a DSL modem, a wireless access point, an Ethernet networking device, an optical networking device, a video encoding device, a media server, or a VoIP device.

16. The computer-implemented method of claim 14 further comprising determining whether a process specified by the policy is operating on the home network.

17. The computer-implemented method of claim 16 wherein the specified process relates to one or more of encryption, authentication, firewall protection, virus protection, spyware protection, access point configuration, or data access.

18. The computer-implemented method of claim 16 further comprising effecting operation of the specified process on the home network.

19. The computer-implemented method of claim 14 further comprising detecting at least one configuration parameter or operational parameter of the at least one device.

20. The computer-implemented method of claim 19 further comprising modifying the at least one configuration parameter or operational parameter of the at least one device.

21. The computer-implemented method of claim 14 further comprising detecting access to the home network by an unauthorized device.

22. The computer-implemented method of claim 21 further comprising configuring the at least one device to inhibit transmission from the unauthorized device to the remote network or other devices on the home network.

23. The computer-implemented method of claim 14 further comprising generating a representation of the home network for presentation in a network operations center (NOC) interface associated with the remote network substantially in real time.

24. The computer-implemented method of claim 14 wherein the at least one of the devices is automatically configured to facilitate compliance with the policy using the background application.

\* \* \* \* \*